(12) United States Patent
Hager et al.

(10) Patent No.: US 8,376,429 B2
(45) Date of Patent: Feb. 19, 2013

(54) JAR LIFTER

(76) Inventors: Scott Hager, Muncie, IN (US); Linda Edgar, Yorktown, IN (US)

(*) Notice: Subject to any disclaimer, the term of this patent is extended or adjusted under 35 U.S.C. 154(b) by 0 days.

(21) Appl. No.: 13/151,775

(22) Filed: Jun. 2, 2011

(65) Prior Publication Data

US 2011/0298229 A1 Dec. 8, 2011

Related U.S. Application Data

(60) Provisional application No. 61/351,994, filed on Jun. 7, 2010.

(51) Int. Cl.
*B65G 7/12* (2006.01)
(52) U.S. Cl. ............... 294/16; 294/118; 294/902
(58) Field of Classification Search .............. 294/31.1, 294/145, 165, 166, 118, 28, 902, 16
See application file for complete search history.

(56) References Cited

U.S. PATENT DOCUMENTS

| | | | |
|---|---|---|---|
| 1,330,487 A * | 2/1920 | Mullen | 294/31.1 |
| 1,343,518 A | 6/1920 | Masker | |
| 1,569,405 A | 1/1926 | Sommer | |
| 1,731,524 A * | 10/1929 | Culp | 294/165 |
| 1,775,309 A * | 9/1930 | Culp | 294/28 |
| 1,777,102 A * | 9/1930 | Mooney | 294/28 |
| 1,974,255 A | 9/1934 | Behrendt | |
| 1,976,623 A * | 10/1934 | Monroe et al. | 81/3.4 |
| 2,029,809 A | 2/1936 | Connolly | |
| 2,032,647 A | 3/1936 | Andrlik | |
| 2,392,118 A * | 1/1946 | Cacarillo | 30/261 |
| 2,396,334 A | 2/1946 | Miller | |
| 2,404,224 A * | 7/1946 | Fink | 294/28 |
| 2,421,509 A * | 6/1947 | Knapp | 294/31.1 |
| 2,634,152 A * | 4/1953 | Dixon | 294/31.1 |
| 3,999,794 A | 12/1976 | Bingaman | |
| 4,108,220 A | 8/1978 | Pantek | |
| 4,174,060 A * | 11/1979 | Porat | 294/166 |
| 4,236,743 A * | 12/1980 | Fox | 294/27.1 |
| 5,085,477 A * | 2/1992 | Gagnon | 294/28 |
| 6,276,732 B1 * | 8/2001 | Hauss | 294/16 |
| 2009/0096232 A1 * | 4/2009 | Sahrai | 294/119 |

* cited by examiner

*Primary Examiner* — Paul T Chin
*Assistant Examiner* — Gabriela Puig
(74) *Attorney, Agent, or Firm* — Lawrence J. Shurupoff

(57) ABSTRACT

A pair of spring-biased pivoting levers is provided with a pair of flexible elastic grips. Each grip is contoured to conform to the surface of a jar and to elastically deform around a jar as a user squeezes the levers together. Each grip can be formed with an arcuate groove for receiving an annular rib commonly formed on canning jars.

12 Claims, 9 Drawing Sheets

JAR LIFTER

CROSS REFERENCE TO RELATED APPLICATION

This application claims the benefit and priority of provisional patent application No. 61/351,994 filed Jun. 7, 2010, and which is incorporated herein by reference.

BACKGROUND AND SUMMARY

Jar lifting tools allow one to transfer extremely hot jars while, for example, engaged in home canning. The presently disclosed jar lifter includes several improvements over conventional jar lifter designs.

One improvement is a spring-loaded center hinge feature. This enhances the gripping function by ensuring jar transfer is achieved using only one hand. As a user squeezes inward on the handles, a spring gradually applies increased back pressure to the user's hand and in turn reduces the feel that the lifter will close freely or simply by gravity alone. The hinge spring keeps the jar lifter in an open position while not in use making it easy for users to stand the tool upright on a countertop. Existing jar lifting products can be difficult to stand up. The hinge spring also enhances the feeling of security and agility when working around boiling water used in canning and sterilizing.

Another improvement includes a limit angle stop feature between a pair of pivoting levers. This prevents the jar lifter from opening up too far (beyond one's grip). Excessively wide open handles significantly increase the difficulty of using the tool. The jar lifter is designed with grips for use with both regular and wide mouth jars. This feature provides a range of motion ensuring both types of jars can be picked up and transferred with little effort.

Another improvement resides in the frame and cast structure of the lifter. In existing jar lifter designs, the frame has often been formed as a closed loop bent wire rod design. For existing lifters, frame fabrication begins by taking a long steel rod and bending four corners to create a rectangle. The two free ends of the rod are then fused together to create a closed loop. The presently disclosed jar lifter has an open loop design with two free legs on each side of a handle manufactured by casting in a mold and made from cast aluminum. The handle and legs are light weight and very strong.

Another improvement comes from the design of the glass-to-jar lifter interface or "grip." The bottom free ends of legs of the aluminum frame are left open and an arched grip formed of flexible rubber is over-molded between the free end posts to create a flexible connection. By employing this design, a user can engage a jar with the grips and squeeze the handles to elastically stretch the rubber form around a jar's neck to enhance the grip and increase gripping surface contact around the jar. The bottom of the rubber form is concave or upwardly arched to match the outer surface contours of many canning jars. This helps to center the rubber form around the neck of a jar.

Still another improvement is found in the handles. The handles are formed with an ergonomic geometry of soft rubber, which provides a pleasant and secure grip. Contoured rubber recesses molded over the aluminum handles help to comfortably center a user's fingers on the handles. A central recess receives a middle finger and a pair of adjacent recesses receive one's index and ring finger.

BRIEF DESCRIPTION OF THE DRAWINGS

In the various views of the drawings, like referenced characters designate like or similar parts.

DESCRIPTION OF REPRESENTATIVE EMBODIMENTS

Figure 1:
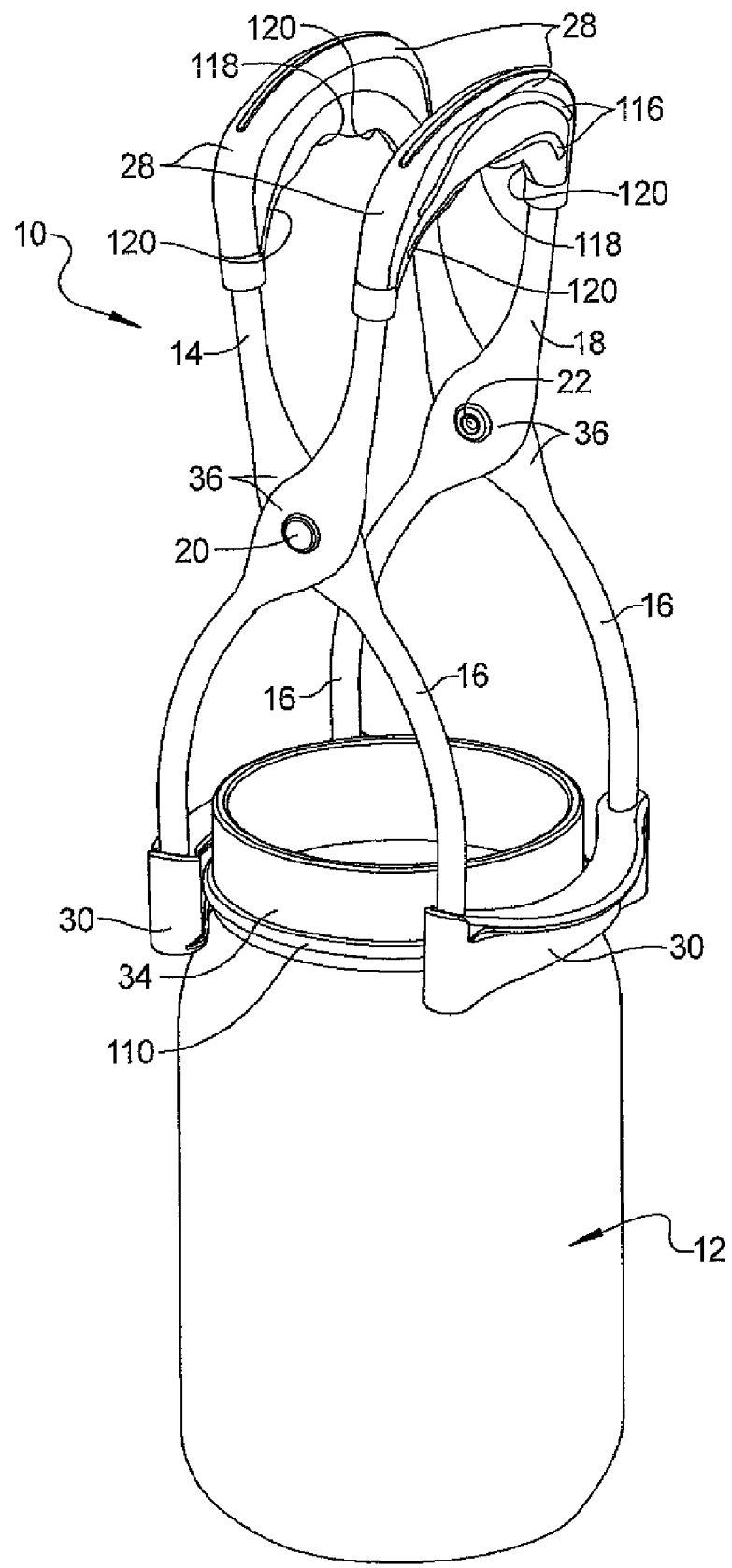
FIG. 1 is a perspective view of a jar lifter positioned in place around a representative canning jar.

As seen in FIG. 1, a jar lifter 10 is engaged around a jar 12 in a manner common in the practice of home canning of fruits, vegetables and other comestibles. The jar lifter 10 includes a first lever 14 and a second lever 18 pivotably interconnected around pivot joints 20, 22. Each lever 14, 18 includes a pair of open legs 16.

The first and second levers 14, 18 are of identical design and can be cast from the same mold. Each lever 14, 18 further includes an overmolded rubber handle 28 and a flexible rubber grip 30 molded on the free ends of each leg 16 for engaging and resiliently conforming to the outer surface contours of the neck 34 of a jar 12.

Figure 2:
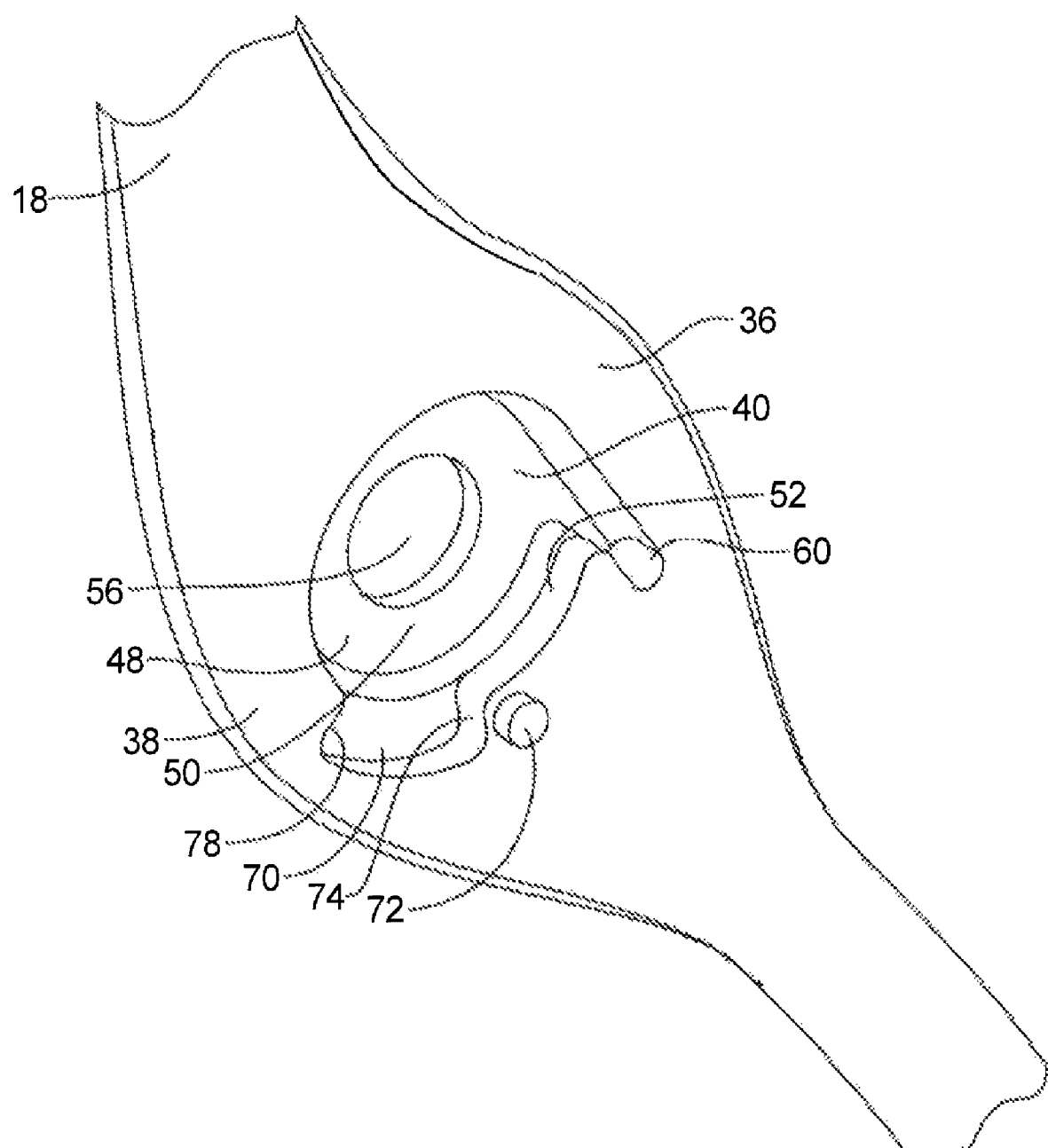
FIG. 2 is an enlarged partial perspective view of a spring housing as formed on each lever of the jar lifter of FIG. 1.
Figure 3:
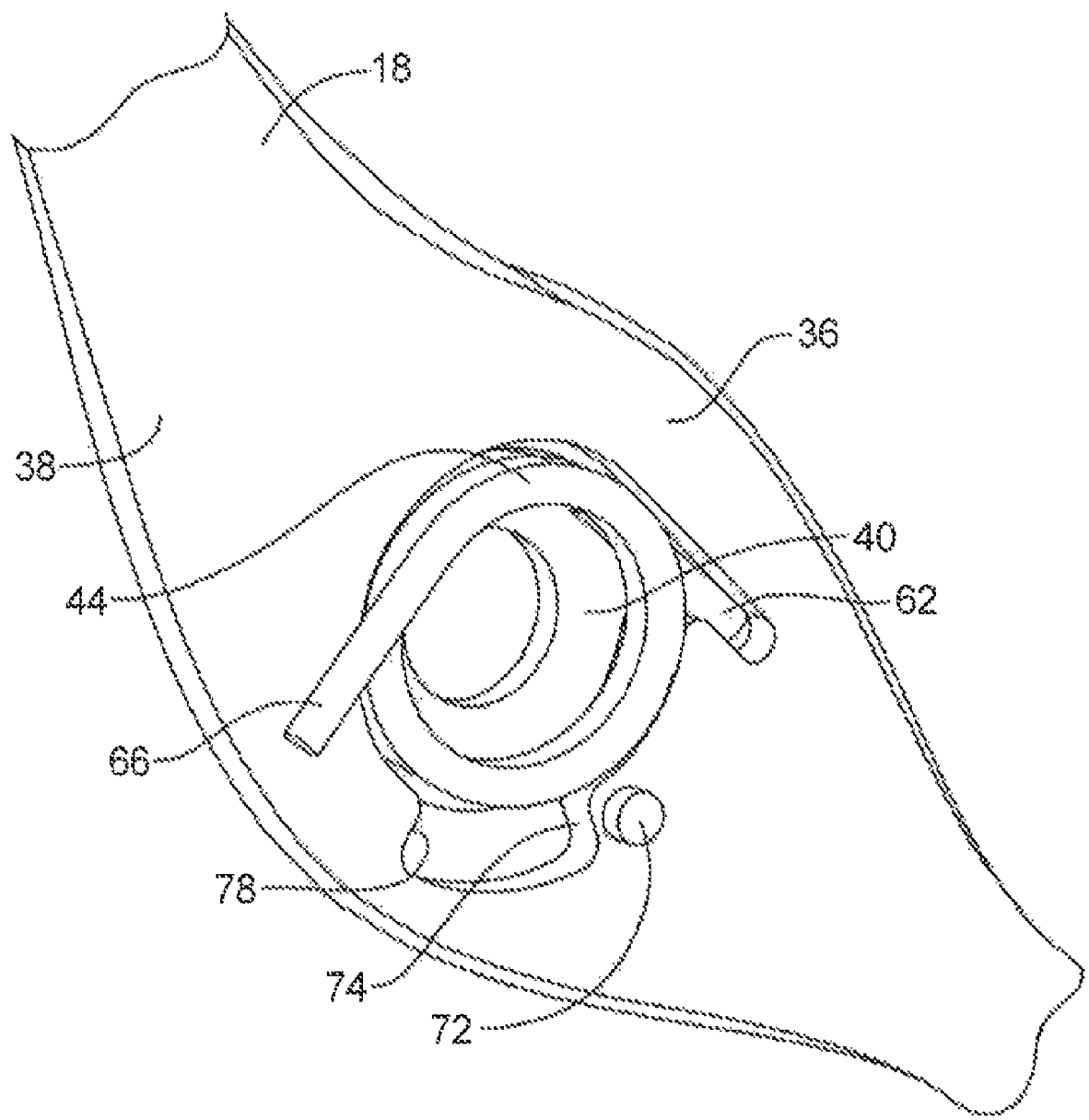
FIG. 3 is a perspective view similar to FIG. 2 showing the addition of a torsion spring within a contoured spring pocket.

Each lever 14, 18 is formed with a flattened central spring housing 36 on each leg 16. As seen in FIG. 2, each, spring housing 36 includes a flat or planar inner wall 38 within which is cast and/or machined a contoured spring pocket 40 conforming to the shape of a torsion spring 44 such as shown in FIG. 3. Spring pocket 40 includes a circular well portion 48 having an annular bottom wall 50 and a cylindrical side wall 52. A circular bore 56 is formed through the center of the bottom wall 50 for receiving a pivot pin as discussed further below.

A spring socket 60 in the form of a groove extending tangentially from the spring pocket 40 is configured to receive and anchor one free end 62 (FIG. 3) of the torsion spring 44. The other free end 66 of the torsion spring is received in an identical spring socket formed in the spring housing 36 of the other confronting and coacting lever 14.

Figure 4:
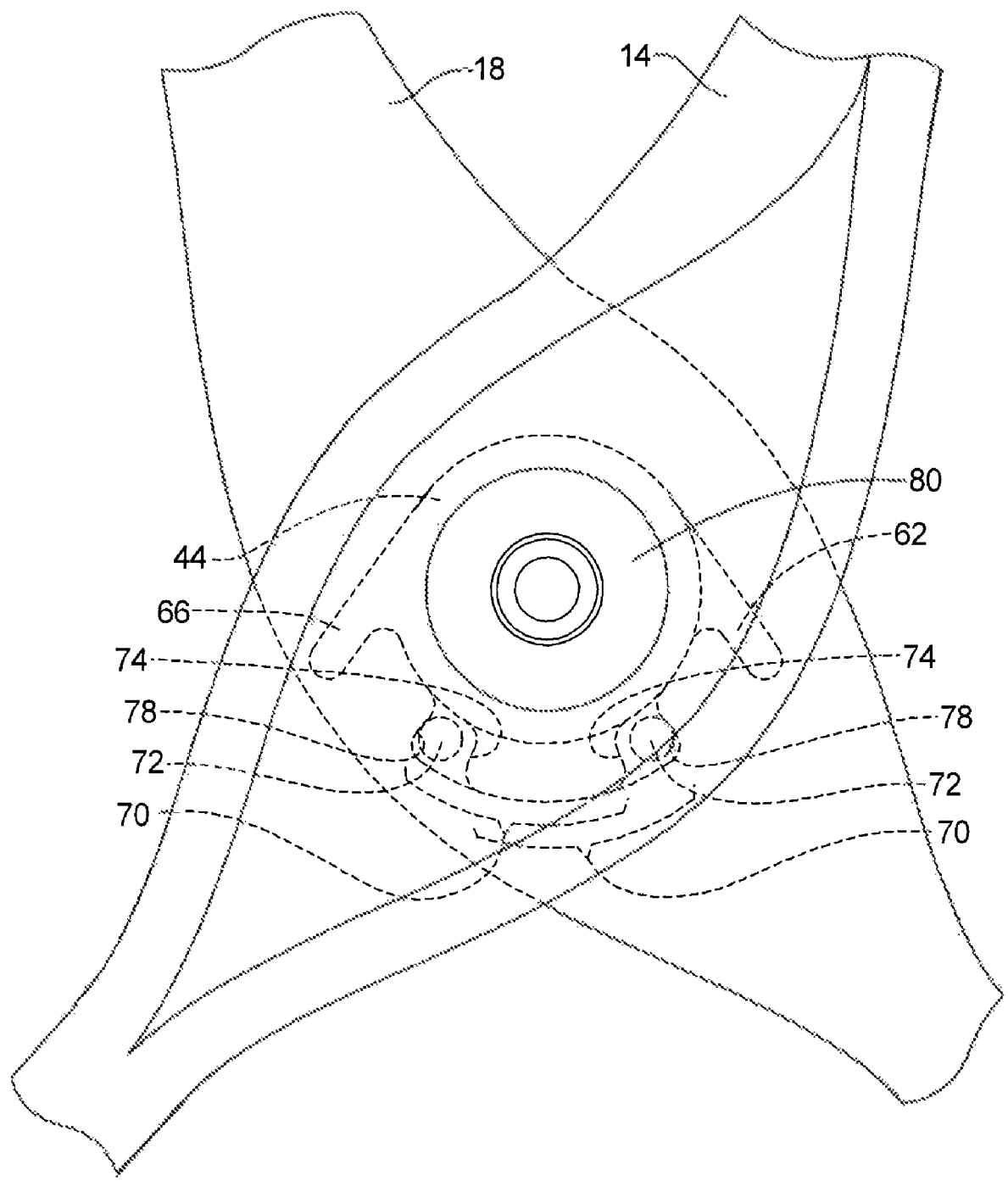
FIG. 4 is a view partially in phantom showing the arrangement of a torsion, spring held within a pair of spring pockets on the jar lifter of FIG. 1 and showing the position of a pair of limit pins limiting the degree of opening of the jar lifter.

As further seen in FIG. 2, a shallow guide slot 70 is formed in the planar wall 38 adjacent to the spring pocket 40. A limit pin 72 projects outwardly from the planar wall 38 adjacent one end wall 74 of guide slot 70. When assembled as seen in dashed lines in FIG. 4, the confronting guide slots 70 in each wall 38 partially overlap. In this wide open position, each limit pin 72 will be biased against the opposite end wall 78 of the confronting guide slot 70 formed on the other coacting lever 14 to limit the pivoting movement of each lever 14, 18.

Figure 5:
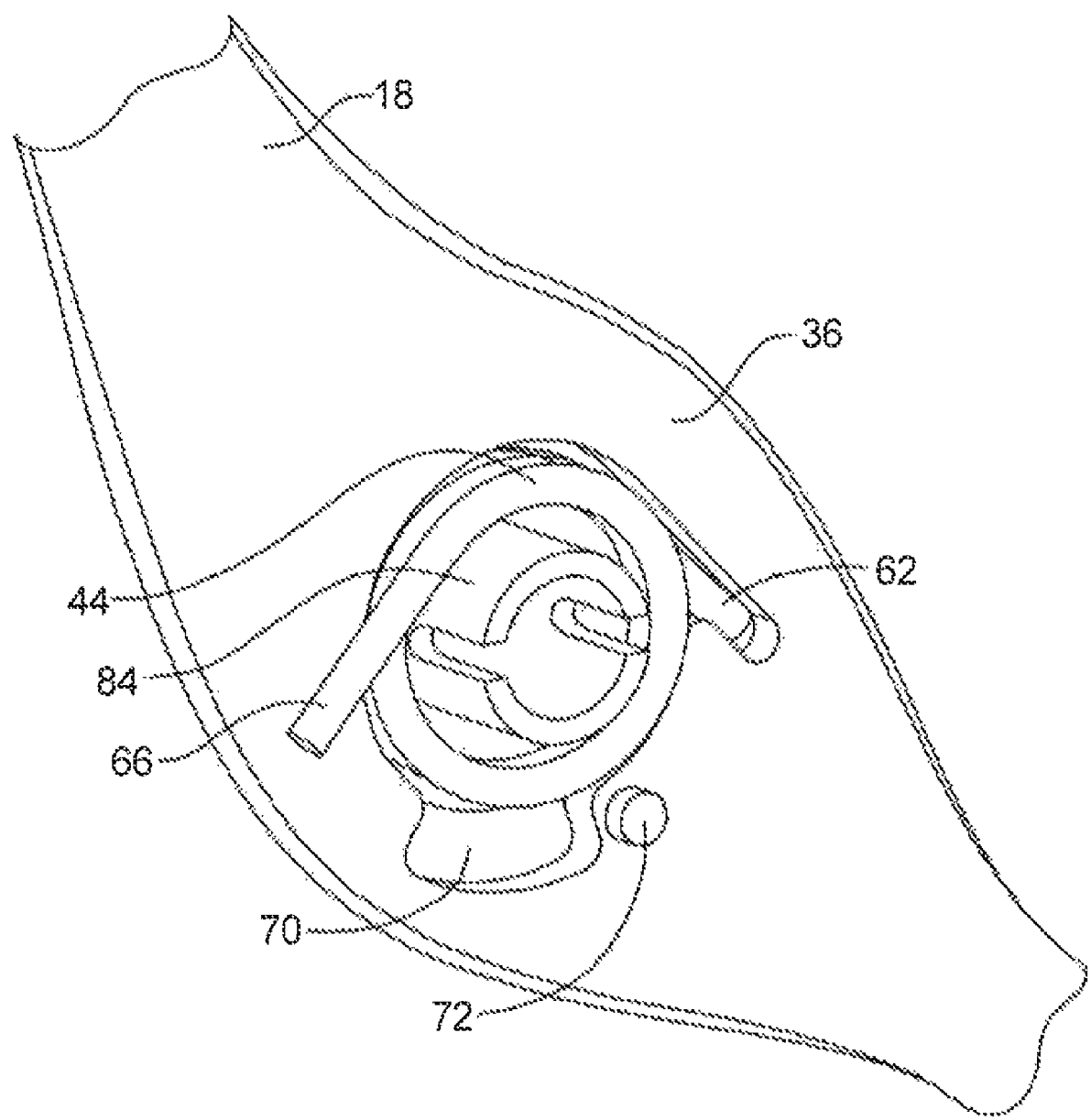
FIG. 5 is a view similar to FIG. 3 but showing the addition of one half of a rivet prior to assembly.
Figure 6:
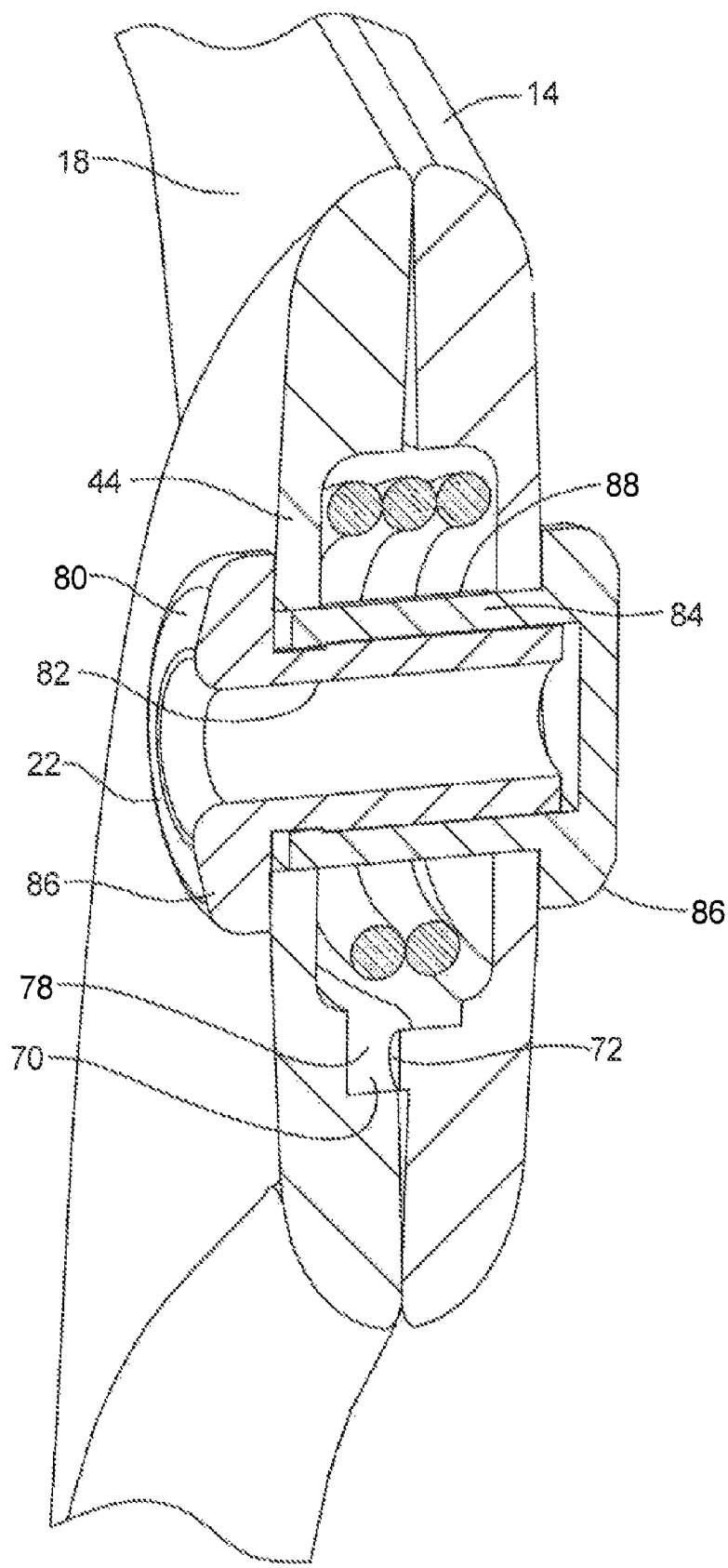
FIG. 6 is a partial perspective view in section showing a torsion spring mounted within a pair of spring pockets.

As seen in FIGS. 5 and 6, a pivot pin 80 pivotally secures the levers 14, 18 together for rotation about the pivot joints 20, 22. Pivot pin 80 can take the form of a two-piece rivet having an inner sleeve 82 and an outer sleeve 84 crimped together in a known fashion with flanges 86 and journal or shaft portion 88 providing a secure pivoting connection between the levers 14, 18.

Figure 7:
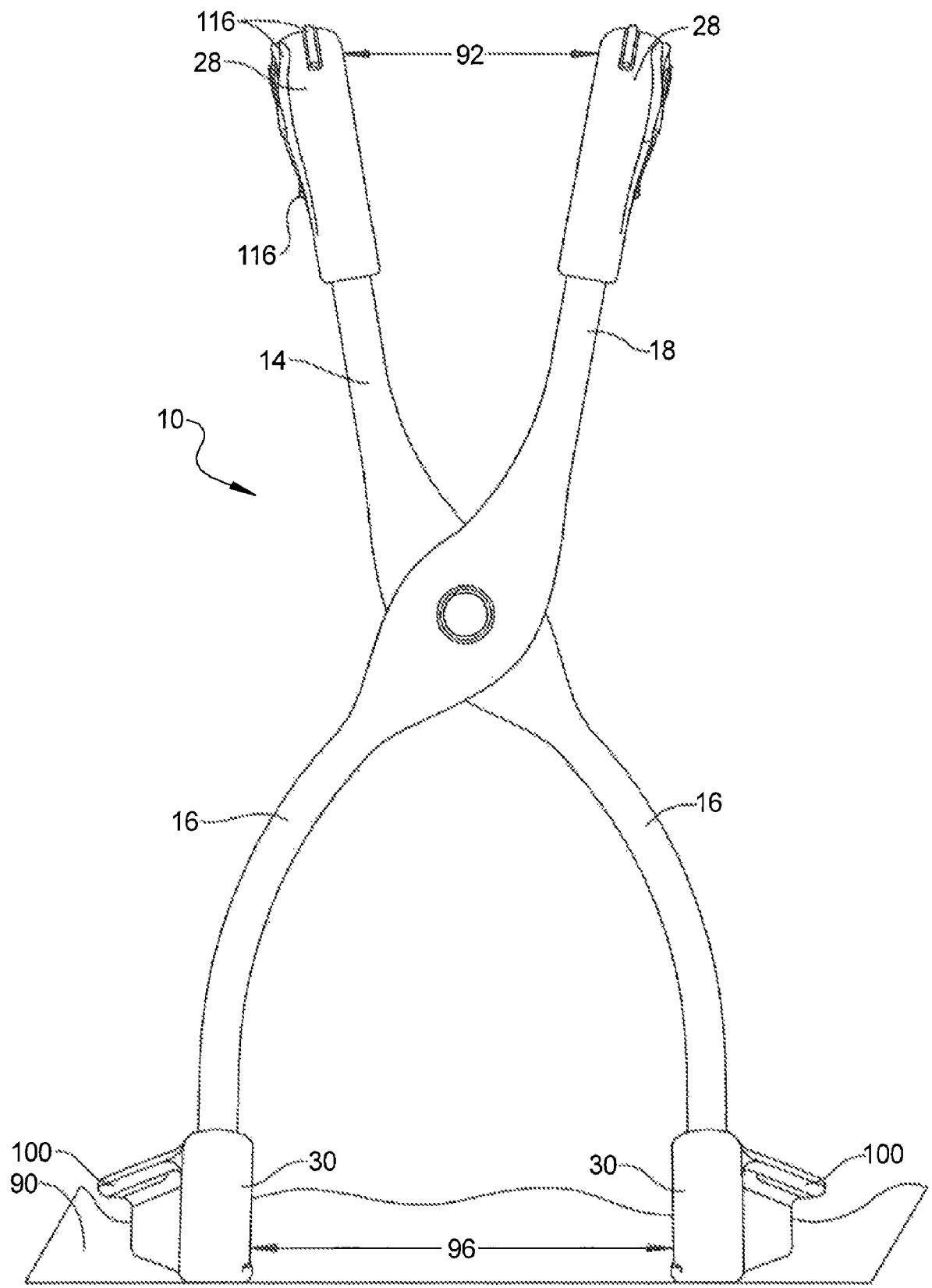
FIG. 7 is a view of the jar lifter of FIG. 1 in an at rest position standing upright on a flat surface.

The arrangement of the torsion springs 44, spring pockets 40, guide slots 70 and limit pins 72 is such that when the jar lifter 10 is fully assembled as shown in FIG. 7, the levers 14, 18 will be biased to a predetermined open position allowing the jar lifter 10 to be easily placed and maintained upright on a flat surface 90. In this position, the torsion springs 44 are fully or close to fully released so that when a user grabs the handles 28 and squeezes them together around a jar 12 or the like, a positive spring resistance is felt providing the user with a safe and secure feeling that the jar lifter is providing a strong and robust grip about the jar or other object.

In the position shown in FIG. 7, the limit pins, 72 are abutting the respective end walls 78 of the other confronting lever to limit the maximum spacing 96 (such as four to five inches) between the rubber grips 30, In one embodiment, the minimum spacing between the rubber grips 30 can be set by the abutment of the rubber handles 28 as they are squeezed together by a user. With the grips 30 spaced apart as shown in FIG. 7, the maximum distance 92 between the handles 28 is also predetermined and set at a distance convenient for gripping by one hand, such as 2.5 to 3.5 inches.

Figure 8:
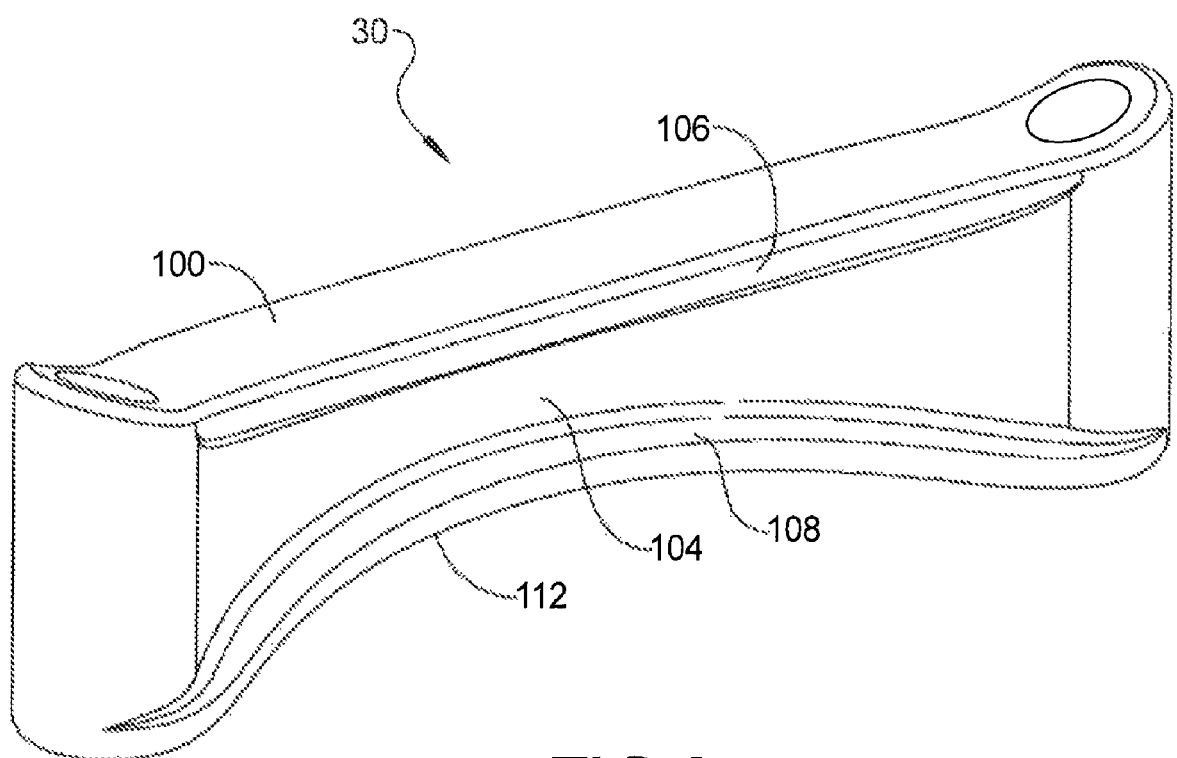
FIG. 8 is an enlarged view of a flexible rubber grip such as shown in FIG. 1.

As further seen in FIGS. 7 and 8, the rubber grips 30 are molded with a lifting or tilting flange 100 which extends outwardly and transversely with respect to the handles 14, 18 to which they are molded. A user can grip, pinch or push on either flange 100 with one hand or finger(s) while holding a hot jar 12 with the jar lifter 10 held in the other hand. This is a handy feature when hot liquid is poured, from a jar 12. As a user grips and tilts one flame 100, the opposite flange 100 can act as a spout for directing liquid into a basin, container or other receptacle.

Figure 9:
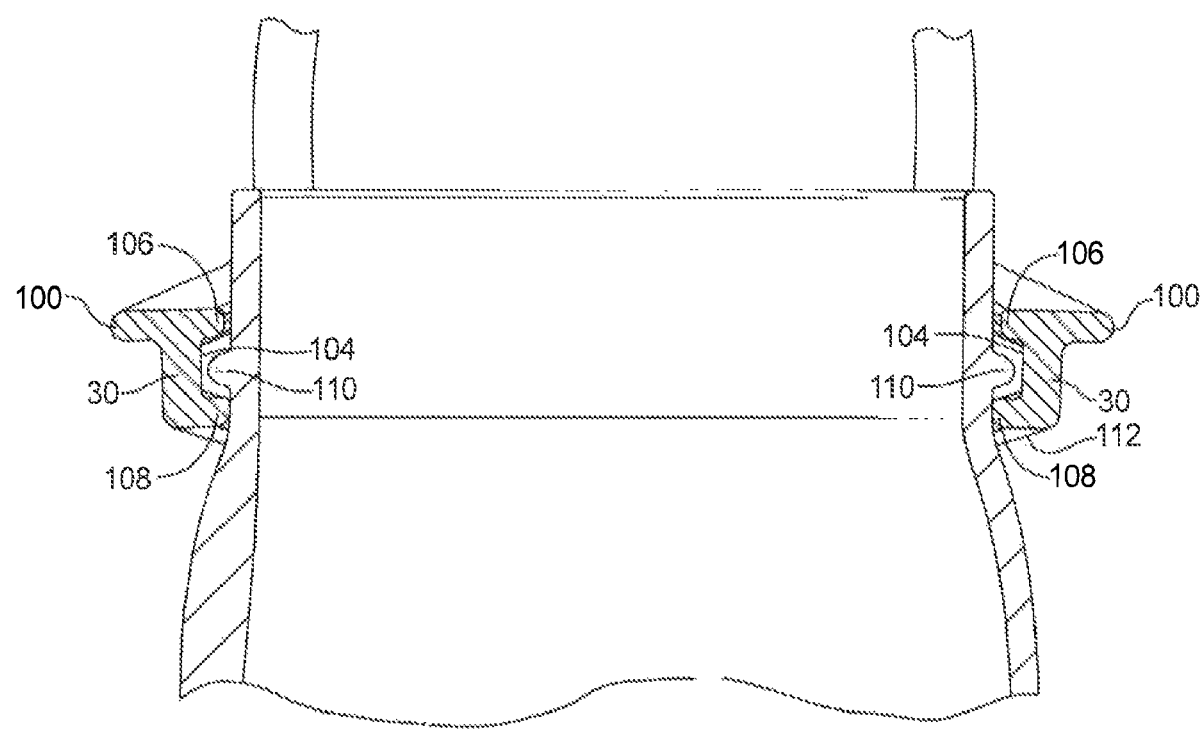
FIG. 9 is a view in section showing the details of the rubber grips engaged about the transfer rib of a jar such as shown in FIG. 1.

As best seen in FIGS. 8 and 9, each flexible elastic rubber grip 30 is formed with an inner groove or channel 104 bounded by an upper flange or lip 106 and a lower flange or lip 108. Channel 104 is shaped with an arcuate concave contour that complements the outer profiles or circumferences of many jars, particularly those used in canning. The upper and lower lips 106, 108 are spaced apart as seen in FIG. 9 so that they can securely surround and grip a circular glass bead 110 known as a "transfer bead" common on jars such as canning jars. This gives a user a positive grip around the top of a jar. In this embodiment, each grip 30 is formed solely of an elastic or rubber material.

Channel 104 can also be placed over a threaded neck portion of a jar such that the threads are securely held within channel 104. Moreover, channel 104 can be paced over a metal band fitted on the neck of a jar to achieve a positive secure grip.

As further seen in FIGS. 8 and 9, the bottom surface 112 of each flexible rubber grip 30 is shaped with a concave or upwardly arched contour spacing the bottom central portion of each grip above surface 90 when positioned as shown in FIG. 7. This contour helps the grips 30 to slide upwardly and around the top curved shoulder portion of a jar and into position around the neck of a jar. The flexibility of each grip 30 also allows it to bend easily and conform to the outer profiles of differently shaped jars. This provides a better grip as well as a more secure feeling to a user.

To enhance a user's grip on the handles 28, ribs 116 can be molded as shown in FIGS. 1 and 7. Moreover, each handle 28 can be molded with a central arched recess 118 on its bottom surface, along with a pair of adjacent finger grooves 120, 120 to naturally and ergonomically direct a user's three middle fingers comfortably and securely around each handle.

It will be appreciated by those skilled in the art that the above jar lifter is merely representative of the many possible embodiments of the invention and that the scope of the invention should not be limited thereto, but instead should only be limited according to the following claims. For example, while two torsion springs have been described in connection with the above embodiment, a single torsion spring can be used to bias both levers 14, 18.

What is claimed:

1. A jar lifter, comprising:
  a first lever;
  a first handle provided on said first lever;
  a second lever pivotally connected to said first lever;
  a second handle provided on said second lever;
  a first flexible arcuate grip provided on said first lever;
  a second flexible arcuate grip provide on said second lever;
  said first and second arcuate grips each comprising a concave bottom surface portion arching upwardly towards said first and second handles;
  a first flange extending outwardly from said first flexible arcuate grip serving as a finger grip for tilting a jar held between said first and second flexible arcuate grips; and
  a second flange extending outwardly from said second flexible arcuate grip serving as a spout for directing liquid from a jar held between said first and second arcuate grips.

2. The jar lifter of claim 1, further comprising a spring-biased pivot connection between said first and second levers.

3. The jar lifter of claim 2, wherein said spring-biased pivot connection comprises a torsion spring held in a pocket defined between said first and second levers.

4. The jar lifter of claim 1, further comprising a pair of limit pins disposed between said first and second levers limiting pivotal movement between said first and second levers.

5. The jar lifter of claim 1, wherein said first and second flexible arcuate grips each comprises a groove for receiving a rib on a jar.

6. The jar lifer of claim 1, wherein said first and second flexible arcuate grips comprise rubber grips molded onto said levers.

7. The jar lifter of claim 1, wherein said first and second rubber grips are constructed solely from molded rubber.

8. The jar lifter of claim 1, wherein said first and second handles each comprises a rubber handle having a central recess for receiving a user's middle finger.

9. The jar lifter of claim 8, further comprising a pair of recesses located adjacent said central recess for receiving a user's index finger and ring finger.

10. A method of lifting a jar containing a hot liquid with a jar lifting tool having a pair of spring-biased levers, a pair of handles on said spring-biased levers, a pair of flexible elastic grips on said pair of spring-biased levers and an outwardly extending flange provided on each one of said pair of flexible elastic grips, wherein said method comprises:
  positioning said pair of spring-biased levers around a jar;
  squeezing said pair of handles toward each other to engage said flexible elastic grips with said jar;
  sliding said pair of flexible elastic grips upwardly around a top portion of a jar and around a neck of a jar;
  elastically deforming said flexible elastic grips around said jar by further squeezing said pair of handles toward each other;
  lifting said jar with said jar lifting tool; and
  tilting said jar by pushing on one flange and directing said hot fluid from said jar over the other flange into a receptacle.

11. The method of claim 10, wherein each flexible elastic grip comprises an arcuate groove and said jar comprises a rib and wherein said method further comprises positioning said arcuate groove over said rib prior to said further squeezing.

12. The method of claim 10, wherein said jar lifting tool comprises a limit stop limiting the maximum distance between said flexible elastic grips, and wherein said method further comprises releasing said pair of handles such that said spring-biased levers are biased to a predetermined open position convenient for gripping by hand.

* * * * *